United States Patent [19]
Mineck et al.

[11] 3,812,333
[45] May 21, 1974

[54] LAGGED ROLL SYNCHRONIZATION AND WASHOUT MEANS FOR AIRCRAFT LATERAL AXIS CONTROL SYSTEM

[75] Inventors: David W. Mineck, Cedar Rapids, Iowa; Girard M. Manke, Los Angeles, Calif.

[73] Assignee: Collins Radio Company, Dallas, Tex.

[22] Filed: Feb. 28, 1973

[21] Appl. No.: 336,673

[52] U.S. Cl..... 235/150.2, 235/150.22, 235/150.26, 244/77 A, 244/77 E
[51] Int. Cl.......................... G06g 7/78, B64c 13/20
[58] Field of Search....... 235/150.2, 150.22, 150.26; 244/77 A, 77 E, 77 M; 340/27 AT, 27 NA; 318/585

[56] References Cited
UNITED STATES PATENTS

| | | |
|---|---|---|
| 3,635,428 | 1/1972 | Nelson et al..................... 244/77 A |
| 3,073,553 | 1/1963 | Coleman et al................... 244/77 E |
| 3,493,836 | 2/1970 | Nelson .......................... 244/77 M X |
| 3,386,689 | 6/1968 | Parker et al...................... 244/77 M |

*Primary Examiner*—Malcolm A. Morrison
*Assistant Examiner*—Jerry Smith
*Attorney, Agent, or Firm*—Richard W. Anderson; Robert J. Crawford

[57] ABSTRACT

A limited washout and synchronization means for developing a beam closure rate signal from bank gyro and lateral accelerometer input sensors permits a lagged roll signal mix with radio deviation in a high gain control system and obviates problems associated with sensor mounting errors, sensor stand-offs, and gyro erection characteristics associated with aircraft maneuvers.

7 Claims, 3 Drawing Figures

LAGGED ROLL SYNCHRONIZATION AND WASHOUT MEANS FOR AIRCRAFT LATERAL AXIS CONTROL SYSTEM

These and other features and objects of the present invention will become apparent upon reading the following description with reference to the accompanying drawing in which.

Figure 1:
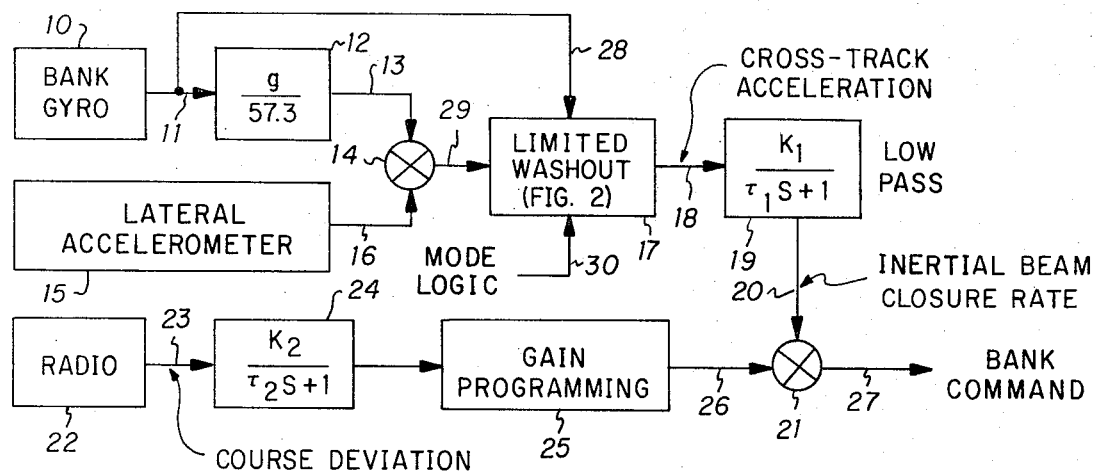
FIG. 1 is a functional block diagram of a lateral control signal formulation in accordance with the present invention.

As above discussed, lateral axis control systems for aircraft of the type designed to use localizer and VOR guidance signals have presented a continuous problem of including ways to overcome noise inherent in the radio system while still providing sufficient control bandwidth and accuracy. Because of the inherent noise characteristics of the radio deviation signals, means other than a pure differentiation of the radio signal to obtain beam closure in the signal mix have generally been replaced by the more preferable development of a beam closure or beam rate signal based on inertial terms such as the employment of the classical lagged roll signal mix.

When utilizing bank and acceleration input sensors, a washout is needed to rid the computation of static errors associated with these types of input sensors. These errors generally are defined as gyro mounting errors, null offsets, etc. Since high gain is desired and these errors are accordingly amplified, intolerable levels of error may result. In systems such as automatic landing systems, wherein redundant computations are employed, the variations in the static sensor errors between sensors employed in the redundant computation channels, when multiplied extensively, lead to discrepancies between the redundant computations that in themselves exceed desirable comparator thresholds which may be utilized to select logically best ones of the computations for ultimate control. Thus a washout of steady state or static errors in the gyro and accelerometer input signals per se is needed.

However, a static error washout cannot be employed continuously, as concerns the gyro and accelerometer inputs, because the washout function would tend to "memorize" false nulls; that is, after a turn maneuver upon roll out, the washout circuitry would have memorized an angle approaching the bank angle experienced during the turn, and the new zero reference (wings level reference) would be false.

In addition, during bank maneuvers (attitudes) in excess of the angle at which bank gyro erection cut-out is effected, the ensuing free drift of the bank gyro would further introduce the memorization in a washout circuitry of an erroneous zero reference upon roll out to wings level, since vertical gyros employ erection circuitry which necessarily must be cut-out during a bank maneuver. Vertical gyros conventionally include erection devices which sense the earth's gravity vector and cause, through appropriate control torquers, the spin axis of the gyro to align itself parallel to the earth's gravity vector. During turns these erection devices sense not only gravity but centrifugal forces as well, resulting in a false vertical reference. With erection cut-out, the gyro experiences free drift which is defined as the rate at which the spin axis departs from its reference position when the erection circuitry is disabled.

While the advantages of employing lagged roll might be realized without incurring the above problems with the use of inertial platforms for providing a true inertial cross-track acceleration, this alternative is expensive, and the present invention obviates the attendant problems by utilizing conventionally mounted gyro and accelerometer and applying the signal mix from these sensors through a controlled synchronization and washout circuitry so as to provide a usable lagged roll signal mix without the economical distress imposed by utilization of inertial platforms. Thus among the objectives of the present invention, as will be apparent from the description to follow, is the elimination of sensor mounting errors and errors due to misalignment between the gyros and accelerometers by passing the mix of these two signals through a washout to eliminate static null errors. Because of closed loop considerations the washout time constant necessarily must be long, for example 20–60 seconds, but the time constant must also be sufficiently short to compensate for gyro erection dynamics, or steady state miscoordination which might result from an engineout case.

Since gyros tend to drift during localizer capture maneuvers when they are above erection cut-off for long periods of time, and the lagged roll signal is not used during all flight modes in a typical automatic flight control system, care must be taken to ensure that a hardover sensor condition is not washed out. Therefore, as will be described, to prevent unlimited authority of the washout circuitry, particularly in the case of redundant system configurations, the washout is limited to prevent unlimited authority.

To eliminate sensitivity to gyro erection characteristics, the present invention provides a hold circuit in conjunction with the washout function. The hold circuit prevents any memorization of nulls during periods when gyro erection is cut out and eliminates memorization of the gyro free drift during turns, etc., which, as previously discussed, result in false reference nulls existing upon roll out to wings-level attitude. Further, as will be described, the hold circuit as concerns the washout function is defeated during the operational mode when the lagged roll signal is actually utilized to ensure maximum signal performance. As will be further evident this defeat is desirable since bank attitude in turbulence may well provide an average bank signal in excess of the gyro erection cutoff angle.

An embodiment of a lagged roll memory synchronization scheme including a limited washout function in accordance with the present invention is depicted functionally in FIG. 1. With reference to FIG. 1, banked gyro 10 provides an output 11 proportional to bank angle which is applied through an appropriate conversion factor 12 to provide a bank signal 13 in terms of "g's" for application to signal combining means 14. Lateral accelerometer 15 provides an output 16 in terms of "g's" as a second input to signal combining means 14. The output 29 from signal combining means 14, comprising a mix of bank and lateral acceleration, would in conventional systems be applied to a lowpass filtering means (such as filter 19) to develop a beam closure rate output signal 20 for subsequent mix with radio deviation 26 to formulate a bank command 27.

In accordance with the present invention, the signal mix of bank attitude and lateral acceleration appearing at output 29 of signal combining means 14 is applied, prior to low pass filtering, through a limited washout circuitry 17 the output 18 of which is applied through low pass filter means 19 to provide the beam closure rate signal 20. As depicted in FIG. 1 the limited washout means 17 receives an input 28 comprising the bank attitude signal, and a third input 30 in the form of mode logic by means of which the aforedefined limited washout and synchronization feature of the present invention are controlled.

FIG. 1 further depicts the formulation of a course deviation signal 23 from radio source 22 which might, as illustrated, be passed through appropriate filtering means 24 and gain programming means 25 to provide a radio deviation output signal 26 for application to output signal combining means 21.

Figure 2:
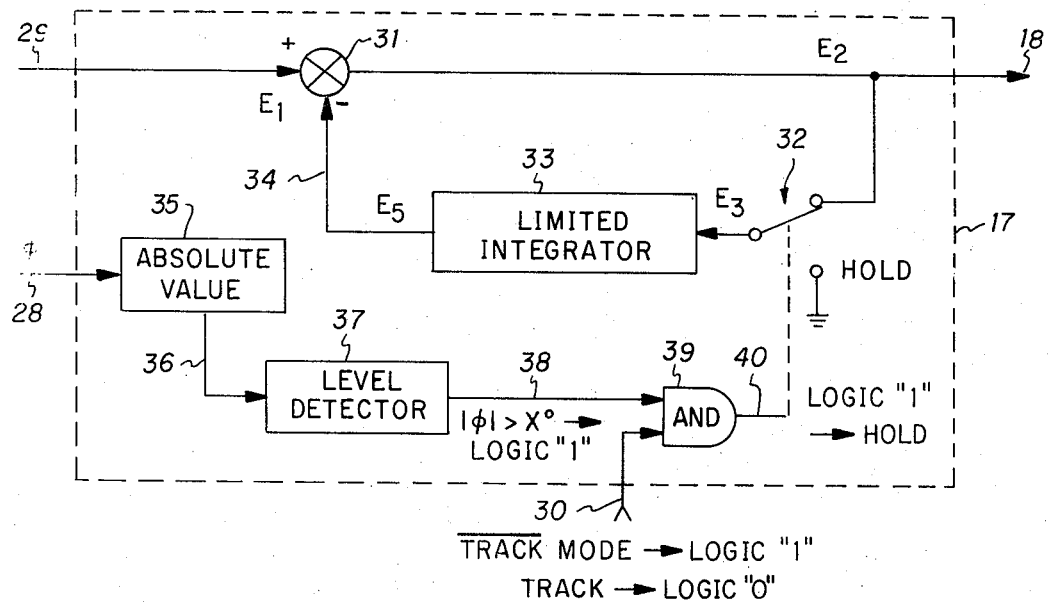
FIG. 2 is a functional diagram of the limited washout functional block of FIG. 1.

The limited washout block 17 of FIG. 1 is depicted in FIG. 2. The output 29 from signal combining means 14, comprising the mix of bank and lateral acceleration, is applied as a first input to a signal combining means 31. The output 18 from signal combining means 31 comprises the cross-track acceleration signal for application to the low pass filtering means 19 of FIG. 1. The output 18 is selectively applied, through the illustrated closed position of switching means 32, as input to a limited integrator 33. The output 34 from limited integrator 33 is applied as a second (subtractive) input to signal mixing means 31 where it is differentially combined with the mix 29 of bank and lateral acceleration from combining means 14.

The bank attitude signal 28, as obtained from the bank gyro 10 of FIG. 1 is applied to an absolute value circuit 35. The output 36 from the absolute value circuit 35, corresponding to the absolute value of the bank attitude signal, is applied to a level detector 37. The output 38 from level detector 37 is applied as a first input to an AND gate 39. A second input 30 to AND gate 39 comprises a system operational mode logic which, for example, might comprise a logic 1 input during $\overline{\text{TRACK}}$ mode as opposed to TRACK operational mode. The output 40 from AND gate 39 is functionally depicted as positioning the switch means 32 in the washout loop. As depicted, level detector 37 might provide a logic 1 output 38 in response to the absolute value of the bank angle $|\phi|$, being equal to or greater than X degrees. This logic 1 input, in conjunction with a logic 1 input on line 30 corresponding to $\overline{\text{TRACK}}$ operational mode, provides a logic 1 output 40 from AND gate 39 which is instrumental in positioning switch 32 to the open (HOLD) position thereof.

In accordance with the present invention, the level detector 37 might provide a logic 1 output when the absolute value of the bank angle is equal to or in excess of the angle at which bank gyro erection cut-out is effected in bank gyro 10, for example 3 degrees of bank.

Figure 3:
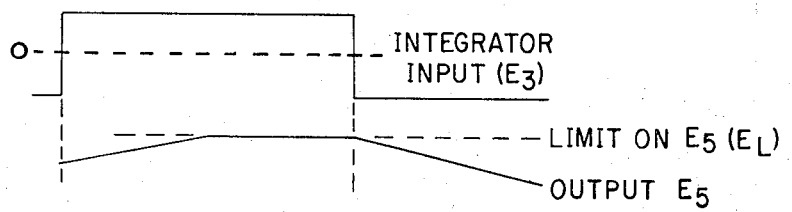
FIG. 3 is a diagrammatic representation of operational characteristics of a limited integrator employed in the limited washout circuitry of FIG. 2.

Limited integrator 33 functions, as depicted by the operational waveforms of FIG. 3, to provide an output 34 which, in response to an exampled step input, builds up at some predefined rate or slope to a predetermined level, at which time the output 34 from the limited integrator levels off. Upon the input signal level changing polarity the limited integrator immediately begins to integrate down as depicted in FIG. 3. This operation, it might be emphasized, is decidedly different than, for example, that which would be realized by an integrator per se followed by a limited amplifier. An integrator followed by a limited amplifier would, in response to a step input, cause the integrator to continue to build up during the duration of the step input and the following limited amplifier would build up to a predetermined amplifier limit. However, upon termination of the step input, the output from the limited amplifier would not begin to decrease until the integrator output itself integrated down to the amplifier limit, in which case a time lag would be involved.

Limited integrators such as depicted in FIG. 2 and operationally defined by the waveforms of FIG. 3 are known in the art. It is merely emphasized here that the limited integrator 33 would not be embodied as an integrator followed by a limited amplifier which, as above discussed, would not provide the operational characteristic depicted in FIG. 3 for the block 33 as embodied in FIG. 2.

The aforedefined objectives of the limited washout and synchronization feature of the present invention are realized as follows:

When $|\phi|$ is less than a predetermined value of X degrees, as detected by level detector 37, the output 38 from the level detector would be a logic 0, the output 40 from AND gate 39 would be logic 0, and loop switch 32 would be in the illustrated closed position. The output $E_2$ is then equal to the input $E_1$ minus the value $E_5$ appearing on the output of the limited integrator.

For inputs $E_1$ equal to or less than $E_L$ (the value of the limit imposed by integrator 33 on its output $E_5$) the output $E_2$ comprises a high-pass type response with a very long time constant; that is, the transfer function of the washout loop between the input $E_1$ and the output $E_2$ might be defined as $\tau S/\tau S + 1$ where $\tau$ is assigned a value of from 20 to 60 seconds.

For static inputs of $E_1$ greater than the limit $E_L$ imposed by limited integrator 33 on its output $E_5$, the output $E_2$ is then equal to $E_1 - E_L$ after a period of time which is long compared to the washout time; that is, after several time constants of the washout transfer function.

When $|\phi|$ is greater than the predetermined number of X degrees, the output from level detector 37 is a logic 1, and, assuming the mode logic input 30 is also a logic 1 in response to $\overline{\text{TRACK}}$ operational mode being experienced, the output 40 from AND gate 39 is a logic 1, which places the washout loop switch 32 in the open (HOLD) position thereof. With the HOLD being imparted, the output $E_2$ from the limited washout circuitry is equal to the input $E_1$ minus the value of $E_5$ (the output of limited integrator 33) at the time that the absolute value of the bank angle exceeded the predetermined number of X degrees. No further washout action occurs then until the absolute value of the bank angle is again less than the predetermined number of X degrees. In accordance with the present invention the predetermined number of X degrees might be selected as the experienced bank attitude at which bank gyro erection cut-off is effected.

It is further apparent from FIG. 2 that in TRACK operational mode a logic 0 input on input 30 to the AND gate 39 defeats the HOLD function such that the washout loop remains in closed operation.

The present invention is thus seen to provide a signal translating means through which a lagged roll signal mix (bank angle and lateral acceleration) may be applied so as to be operational effective in the formulation of a bank command signal when mixed with radio deviation. A limit on the washout function imposes a limited washout authority; steady state mounting errors and offsets from the gryo and accelerometer input sensors are effectively washed out on a long term steady-state basis while hard-over inputs from these sensors are not permitted to have unlimited authority due to the limit imposed on the washout. Means are provided for preventing the washout function from memorizing false nulls which may occur during aircraft maneuvers or due to gyro erection characteristics. The circuitry thus permits the use of conventional bank gyro and lateral accelerometer input sensors in a lagged roll signal mix in a high gain system while obviating the problems attendant with utilizing these sensors to develop an inertial-type signal.

Although the present invention has been described with respect to a particular embodiment thereof, it is not to be so limited as changes might be made therein which will be within the scope of the invention as defined in the appended claims.

We claim:

1. In an aircraft control system of the type developing a bank command signal from a signal mix of a signal proportional to deviation from a radio defined path with a low-passed summation of signals proportional to aircraft bank attitude and lateral acceleration, said summation of signals respectively obtained from bank gyro and lateral accelerometer sensors; means for selectively imposing a limited washout on said summation of signals comprising signal combining means receiving said summation of signals as a first input thereto, signal integrating means the integration level of which is limited at a predetermined signal amplitude, switching means, the output from said signal combining means being selectively applied through a closed position of said switching means as input to said signal integrating means, the output of said signal integrating means being applied as a second input to said signal combining means in a mutually subtractive sense as concerns said first input to said signal combining means, switch control means responsive to magnitudes of said aircraft bank attitude signal being less than a predetermined magnitude to close said switching means and being responsive to magnitudes of said aircraft bank attitude signal in excess of said predetermined magnitude to open said switching means, and the output of said signal combining means comprising said summation of signals with imposed limited washout.

2. A system as defined in claim 1 wherein said switch control means comprises mode logic means responsive to a predetermined system operational mode being effected to enable the closing of said switching means and responsive to system operational modes other than said predetermined operational mode to defeat the closing of said switching means.

3. A system as defined in claim 2 wherein said switch control means comprises means receiving said aircraft bank attitude signal and developing an output corresponding to the absolute value thereof, level detecting means responsive to said absolute value signal to provide discrete logic level outputs corresponding respectively to said absolute value signal being less and greater than said predetermined magnitude, AND gating means receiving the output from said level detecting means and an output from said mode logic means as respective inputs thereto, and said switching means being responsive to discrete logic level outputs of said AND gating means to be respectively opened and closed thereby.

4. A system as defined in claim 2 wherein said means for imposing a limited washout, upon said switching means being closed, exhibits a signal transfer function between the input terminal and output terminal thereof defined as $\tau S/\tau S+1$, where $\tau$ is a substantially long time constant and S is the laplacian operator.

5. A system as defined in claim 4 wherein said switch control means comprises means receiving said aircraft bank attitude signal and developing an output corresponding to the absolute value thereof, level detecting means responsive to said absolute value signal to provide discrete logic level outputs corresponding respectively to said absolute value signal being less and greater than said predetermined magnitude, AND gating means receiving the output from said level detecting means and an output from said mode logic means as respective inputs thereto, and said switching means being responsive to discrete logic level outputs of said AND gating means to be respectively opened and closed thereby.

6. A system as defined in claim 5 wherein $\tau$ is a predetermined constant between 20 and 60 seconds.

7. A system as defined in claim 6 wherein said switching means upon being opened effects a grounding of the input of said signal integrating means.

* * * * *